(12) United States Patent
Filatov et al.

(10) Patent No.: US 8,796,894 B2
(45) Date of Patent: Aug. 5, 2014

(54) COMBINATION RADIAL/AXIAL ELECTROMAGNETIC ACTUATOR

(75) Inventors: Alexei V. Filatov, Fullerton, CA (US); Lawrence A. Hawkins, Redondo Beach, CA (US)

(73) Assignee: Calnetix Technologies, L.L.C., Yorba Linda, CA (US)

( * ) Notice: Subject to any disclaimer, the term of this patent is extended or adjusted under 35 U.S.C. 154(b) by 697 days.

(21) Appl. No.: 12/985,911

(22) Filed: Jan. 6, 2011

(65) Prior Publication Data

US 2011/0163622 A1    Jul. 7, 2011

Related U.S. Application Data

(60) Provisional application No. 61/292,746, filed on Jan. 6, 2010.

(51) Int. Cl.
*H02K 1/06*      (2006.01)
*H02K 7/09*      (2006.01)

(52) U.S. Cl.
USPC ............. 310/90.5; 310/216.011; 310/216.008

(58) Field of Classification Search
CPC ............. H02K 1/08; H02K 1/12; H02K 1/14
USPC ............................ 310/90.5, 216.008, 216.011
See application file for complete search history.

(56) References Cited

U.S. PATENT DOCUMENTS

| | | |
|---|---|---|
| 1,916,256 A | 7/1933 | Chandeysson |
| 2,276,695 A | 3/1942 | Lavarello |
| 2,345,835 A | 4/1944 | Serduke |
| 2,409,857 A | 10/1946 | Hines et al. |
| 2,917,636 A | 12/1959 | Akeley |
| 3,060,335 A | 10/1962 | Greenwald |
| 3,064,942 A | 11/1962 | Martin |
| 3,439,201 A | 4/1969 | Levy et al. |

(Continued)

FOREIGN PATENT DOCUMENTS

| | | |
|---|---|---|
| DE | 102006004836 A1 | 5/2007 |
| EP | 0774824 | 5/1997 |

(Continued)

OTHER PUBLICATIONS

U.S. Appl. No. 13/116,991, filed May 26, 2011, Filatov.

(Continued)

*Primary Examiner* — Terrance Kenerly
*Assistant Examiner* — David Scheuermann
(74) *Attorney, Agent, or Firm* — Fish & Richardson P.C.

(57) ABSTRACT

An electromagnetic actuator includes a body and first and second poles residing apart from the body. The first and second poles communicate magnetic flux across a gap with opposing end facing surfaces of the body. The body, the first pole, and the second pole are magnetically coupled and define an axial magnetic control circuit. A plurality of radial poles reside apart from the body, adjacent a lateral facing surface of the body, and communicate magnetic fluxes with the lateral facing surface. The body and the plurality of radial poles define a plurality of radial magnetic control circuits. The plurality of radial poles communicate magnetic fluxes with the lateral facing surface and at least one of the first pole or the second pole, and the body, the plurality of radial poles, and at least one of the first pole or the second pole define a magnetic bias circuit.

21 Claims, 6 Drawing Sheets

(56) References Cited

U.S. PATENT DOCUMENTS

| | | | |
|---|---|---|---|
| 3,937,533 A * | 2/1976 | Veillette | 310/90.5 |
| 3,943,443 A | 3/1976 | Kimura et al. | |
| 4,093,917 A | 6/1978 | Haeussermann | |
| 4,127,786 A | 11/1978 | Volkrodt | |
| 4,170,435 A | 10/1979 | Swearingen | |
| 4,260,914 A | 4/1981 | Hertrich | |
| 4,358,697 A | 11/1982 | Liu et al. | |
| 4,362,020 A | 12/1982 | Meacher et al. | |
| 4,415,024 A | 11/1983 | Baker | |
| 4,635,712 A | 1/1987 | Baker et al. | |
| 4,639,665 A | 1/1987 | Gary | |
| 4,642,501 A | 2/1987 | Kral et al. | |
| 4,659,969 A | 4/1987 | Stupak | |
| 4,731,579 A | 3/1988 | Petersen et al. | |
| 4,740,711 A | 4/1988 | Sato et al. | |
| 4,806,813 A | 2/1989 | Sumi et al. | |
| 4,920,291 A | 4/1990 | McSparran | |
| 4,948,348 A | 8/1990 | Doll et al. | |
| 5,003,211 A | 3/1991 | Groom | |
| 5,083,040 A | 1/1992 | Whitford et al. | |
| 5,115,192 A | 5/1992 | Bardas et al. | |
| 5,241,425 A | 8/1993 | Sakamoto et al. | |
| 5,315,197 A | 5/1994 | Meeks et al. | |
| 5,481,145 A | 1/1996 | Canders et al. | |
| 5,514,924 A | 5/1996 | McMullen et al. | |
| 5,559,379 A | 9/1996 | Voss | |
| 5,589,262 A | 12/1996 | Kiuchi et al. | |
| 5,627,420 A | 5/1997 | Rinker et al. | |
| 5,672,047 A | 9/1997 | Birkholz | |
| 5,739,606 A | 4/1998 | Takahata et al. | |
| 5,767,597 A | 6/1998 | Gondhalekar | |
| 5,831,431 A | 11/1998 | Gottfried-Gottfried et al. | |
| 5,939,879 A | 8/1999 | Wingate et al. | |
| 5,942,829 A | 8/1999 | Huynh | |
| 5,994,804 A | 11/1999 | Grennan et al. | |
| 6,087,744 A | 7/2000 | Glauning | |
| 6,130,494 A | 10/2000 | Schöb | |
| 6,148,967 A | 11/2000 | Huynh | |
| 6,167,703 B1 | 1/2001 | Rumez et al. | |
| 6,191,511 B1 | 2/2001 | Zysset | |
| 6,259,179 B1 | 7/2001 | Fukuyama et al. | |
| 6,268,673 B1 | 7/2001 | Shah et al. | |
| 6,270,309 B1 | 8/2001 | Ghetzler et al. | |
| 6,304,015 B1 | 10/2001 | Filatov et al. | |
| 6,313,555 B1 | 11/2001 | Blumenstock et al. | |
| 6,325,142 B1 | 12/2001 | Bosley et al. | |
| 6,359,357 B1 | 3/2002 | Blumenstock | |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 | 3/2004 | McMullen et al. | |
| 6,727,617 B2 | 4/2004 | McMullen et al. | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,885,121 B2 | 4/2005 | Okada et al. | |
| 6,897,587 B1 | 5/2005 | McMullen et al. | |
| 6,925,893 B2 | 8/2005 | Abe et al. | |
| 6,933,644 B2 | 8/2005 | Kanebako | |
| 7,042,118 B2 | 5/2006 | McMullen et al. | |
| 7,135,857 B2 | 11/2006 | Johnson | |
| 7,557,480 B2 | 7/2009 | Filatov | |
| 7,635,937 B2 | 12/2009 | Brunet et al. | |
| 8,169,118 B2 | 5/2012 | Filatov | |
| 2001/0017500 A1 * | 8/2001 | Hirama et al. | 310/217 |
| 2001/0030471 A1 | 10/2001 | Kanebako | |
| 2002/0006013 A1 | 1/2002 | Sato et al. | |
| 2002/0175578 A1 | 11/2002 | McMullen et al. | |
| 2003/0155829 A1 | 8/2003 | McMullen et al. | |
| 2003/0197440 A1 | 10/2003 | Hasegawa et al. | |
| 2005/0093391 A1 | 5/2005 | McMullen et al. | |
| 2007/0056285 A1 | 3/2007 | Brewington | |
| 2007/0063594 A1 | 3/2007 | Huynh | |
| 2007/0164627 A1 | 7/2007 | Brunet et al. | |
| 2007/0200438 A1 | 8/2007 | Kaminski et al. | |
| 2007/0296294 A1 | 12/2007 | Nobe et al. | |
| 2008/0211355 A1 | 9/2008 | Sakamoto et al. | |
| 2008/0246373 A1 | 10/2008 | Filatov | |
| 2008/0252078 A1 | 10/2008 | Myers | |
| 2009/0004032 A1 | 1/2009 | Kaupert | |
| 2009/0201111 A1 | 8/2009 | Filatov | |
| 2009/0295244 A1 | 12/2009 | Ries | |
| 2010/0007225 A1 | 1/2010 | Platon et al. | |
| 2010/0090556 A1 | 4/2010 | Filatov | |
| 2010/0117627 A1 | 5/2010 | Filatov | |
| 2010/0301840 A1 | 12/2010 | Filatov | |
| 2011/0101905 A1 | 5/2011 | Filatov | |
| 2011/0234033 A1 | 9/2011 | Filatov | |
| 2012/0212093 A1 * | 8/2012 | Sande et al. | 310/90.5 |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |

OTHER PUBLICATIONS

U.S. Appl. No. 13/045,379, filed Mar. 10, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003, printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Honeywell, "Genetron®245fa Applications Development Guide," (15 pages), 2000.

Hawkins, Lawrence A. et al., *Analysis and Testing of a Magnetic Bearing Energy Storage Flywheel with Gain-Scheduled, Mimo Control*," Proceedings of ASME Turboexpo 2000, Munich, Germany, May 8-11, 2000, pp. 1-8.

McMullen, Patrick T. et al., "*Combination Radial-Axial Magnetic Bearing*," Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel*," 8th International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications*," 24th International PCIM Conference, Nuremberg, Germany, May 20-22, 2003, 6 pages.

Hawkins, Larry et al., "*Development of an AMB Energy Storage Flywheel for Industrial Applications*," 7th International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

Hawkins, Larry et al., "*Development of an AMB Energy Storage Flywheel for Commercial Application*," International Symposium on Magnetic Suspension Technology, Dresden, Germany, Sep. 2005, 5 pages.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

(56) References Cited

OTHER PUBLICATIONS

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Technical Overview "A System Overview," (1 page), available at http://http://www.freepower.co.uk/tech-overview.htm, 2000-2006, printed Jul. 26, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.

Freepower ORC Electricity Company Home Page, "Welcome to Freepower," (1 page) available at http://www.freepower.co.uk/, Jul. 18, 2006.

PureCycle: Overview, "Super-efficient, reliable, clean energy-saving alternatives—the future is here," (1 page) available at http://www.utcpower.com/fs/com/fs_com_Page/0,5433,03400,00.html, printed Jul. 26, 2006.

Ormat Web Site: "Recovered Energy Generation in the Cement Industry," (2 pages) available at http://www.ormat.com/technology_cement_2.htm, printed Jul. 26, 2006.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

International Search Report and Written Opinion of the International Searching Authority issued in International Application No. PCT/US2009/031837 on Sep. 7, 2009; 11 pages.

International Preliminary Report on Patentability issued in International Application No. PCT/US2009/031837 on Jul. 27, 2010, 6 pages.

International Search Report and Written Opinion of the International Searching Authority issued in International Application No. PCT/US2009/058816, mailed Jun. 10, 2010, 10 pages.

International Preliminary Report on Patentability issued in International Application No. PCT/US2009/058816 on Apr. 12, 2011, 5 pages.

Meeks, Crawford, "*Development of a Compact, Lightweight Magnetic Bearing*," 26th Annual AIAA/SAE/ASME/ASEE Joint Propulsion Conference, Jul. 16-18, 1990, 9 pages.

Ehmann et al., "*Comparison of Active Magnetic Bearings With and Without Permanent Magnet Bias*," Ninth International Symposium on Magnetic Bearings, Lexington, Kentucky, Aug. 3-6, 2004, 6 pages.

Office Action issued in U.S. Appl. No. 12/267,517 on Mar. 28, 2011, 9 pages.

Office Action issued in U.S. Appl. No. 12/569,559 on Apr. 25, 2011, 22 pages.

Notice of Allowance issued in Application U.S. Appl. No. 12/569,559 on Aug. 9, 2011, 9 pages.

Notice of Allowance issued in Application U.S. Appl. No. 12/358,172 on Sep. 20, 2011, 10 pages.

Notice of Allowance issued in U.S. Appl. No. 12/569,559 on Jan. 27, 2012, 6 pages.

Request for Continued Examination filed in U.S. Appl. No. 12/569,559 on Nov. 9, 2011, 13 pages.

Notice of Allowance issued in U.S. Appl. No. 12/267,517 on Feb. 21, 2012, 7 pages.

Amendment filed in U.S. Appl. No. 12/267,517 on Jan. 31, 2012, 9 pages.

Office Action issued in U.S. Appl. No. 12/475,052 on Jun. 19, 2012, 9 pages.

Office Action issued in U.S. Appl. No. 12/475,052 on Sep. 12, 2012, 8 pages.

Notice of Allowance issued in U.S. Appl. No. 12/610,766, on Oct. 19, 2012; 7 pages.

Office Action issued in U.S. Appl. No. 13/116,991 on Oct. 26, 2012; 13 pages.

Sortore, Christopher K. et al., "Design of Permanent Magnet Biased Magnetic Bearings for a Flexible Rotor" Presentation at the 44th MFPG Meeting, Virginia Beach, VA, Apr. 2-5, 1990 (10 pages).

Notice of Allowance issued in U.S. Appl. No. 13/116,991 on Mar. 7, 2013, 7 pages.

Office Action issued in U.S. Appl. No. 13/045,379 on Jun. 21, 2013, 19 pages.

Final Office Action issued in U.S. Appl. No. 13/045,379 on Nov. 27, 2013, 19 pages.

\* cited by examiner

COMBINATION RADIAL/AXIAL ELECTROMAGNETIC ACTUATOR

CLAIM OF PRIORITY

This application claims priority under 35 U.S.C. §119 to U.S. Provisional Patent Application Ser. No. 61/292,746, filed on Jan. 6, 2010, the entire contents of which are hereby incorporated by reference.

TECHNICAL FIELD

This disclosure relates to generating electromagnetic forces through an electromagnetic actuator, and, more particularly, to generating radial and axial electromagnetic forces using a combination radial/axial electromagnetic actuator with an improved axial bandwidth.

BACKGROUND

Equipment and machinery often contain moving (e.g., rotating, translating) members, which require support during operation. A bearing, or similar device, may be used to support the moving member. Although many types of bearings require direct contact with the member to provide the necessary support, some applications benefit from non-contact, or nearly non-contact support for the member. A magnetic bearing uses an electromagnetic actuator to apply a controlled electromagnetic force to support the moving member in a non-contact, or nearly non-contact, manner. The non-contact or nearly non-contact support provided by the magnetic bearing can provide frictionless or nearly frictionless movement of the member in both the axial and radial directions.

SUMMARY

In certain implementations, an electromagnetic actuator may include a body with a rotational axis. A first pole may reside apart from the body, the first pole may be adjacent a first end facing surface of the body and adapted to communicate magnetic flux across a gap with the first end facing surface of the body. A second pole may reside apart from the body, the second pole may be adjacent a second end facing surface of the body and adapted to communicate magnetic flux with the second end facing surface of the body. The body, the first pole, and the second pole may be magnetically coupled and define an axial magnetic control circuit. A plurality of radial poles may reside apart from the body, the plurality of radial poles adjacent a lateral facing surface of the body and adapted to communicate magnetic fluxes with the lateral facing surface of the body. The body and the plurality of radial poles define a plurality of radial magnetic control circuits, the plurality of radial poles adapted to communicate magnetic fluxes with the lateral facing surface of the body and at least one of the first pole or the second pole. The body, the plurality of radial poles, and at least one of the first pole or the second pole define a magnetic bias circuit.

In certain implementations, an electric machine system includes a stator and a rotor, the rotor having a rotational axis configured to move relative to the stator. The system may also include an electromagnetic actuator subassembly that includes a cylindrical actuator target rigidly mounted on the rotor. A first axial pole may reside apart from the actuator target, the first axial pole adjacent a first end facing surface of the actuator target and adapted to communicate magnetic flux across a gap with the first end facing surface of the actuator target. A second axial pole residing apart from the actuator target, the second axial pole adjacent a second end facing surface of the actuator target and adapted to communicate magnetic flux with the second end facing surface of the actuator target. An axial back-iron may magnetically link the first axial pole and the second axial pole. The actuator target, the first axial pole, the second axial pole and the axial back-iron may be magnetically coupled and define an axial magnetic control circuit. An axial control conductive coil may be adapted to produce a magnetic flux in the axial magnetic control circuit. A magnetically permeable annual element located concentric to the rotational axis and including a plurality of radial poles and an electrically isolating radial gap interrupting a conductive path around the rotational axis, the magnetically permeable annual element including a plurality of radial poles residing apart from the actuator target, the plurality of radial poles adjacent a lateral facing surface of the actuator target and adapted to communicate magnetic fluxes with the lateral facing surface of the actuator target, the actuator target and the plurality of radial poles defining a plurality of radial magnetic control circuits, the plurality of radial poles adapted to communicate magnetic fluxes with the lateral facing surface of the actuator target and at least one of the first axial pole or the second axial pole, the actuator target, the plurality of radial poles and at least one of the first axial pole or the second axial pole defining a magnetic bias circuit. Radial control conductive coils may be wound around the radial poles and adapted to produce a magnetic flux in the radial magnetic control circuit. One or more position sensors may be configured to sense a position of the actuator target. At least one control electronics package may be configured to control the electric currents in the axial control conductive coil and radial control conductive coils.

In certain implementations, a method for exerting axial and radial forces on a cylindrical body having a symmetry axis includes communicating a first bias magnetic flux through a first axial facing surface of the body. The method may also include communicating a second bias magnetic flux through a second axial facing surface of the body. The method may also include communicating combined the first and the second bias magnetic fluxes through a lateral surface of the cylindrical body. In addition, the method may include communicating an axial control magnetic flux through the first and the second axial facing surfaces of the body. Communicating a radial control magnetic flux diagonally across the body may be accomplished by a stationary radial pole assembly located around the body and separated from it. Electrical currents may be suppressed in the stationary radial pole assembly by introducing isolating interrupts of the conductive paths.

In certain implementations, the end facing surface of the body is orthogonal to the rotational axis. In some implementations, the body incorporates a magnetically permeable actuator target, the actuator target adapted to communicate a magnetic flux.

In some embodiments, a magnetic element may be configured to produce magnetic bias flux in the magnetic bias circuit. An axial coil may be adapted to produce a magnetic flux in the axial magnetic control circuit and a plurality of radial coils adapted to produce magnetic fluxes in the plurality of radial magnetic control circuits.

In certain implementations, the magnetic flux entering the end facing surface of the body exerts an axial force on the body and the magnetic fluxes entering the lateral surface of the body exert radial forces on the body. In certain instances, the axial force is proportional to the magnetic flux in the axial magnetic control circuit and the radial forces are proportional to the magnetic fluxes in the radial magnetic control circuits.

In implementations, the plurality of radial poles is defined by a first annular lamination and a second annular lamination, the first and second annular laminations defining an annular lamination stack coaxial to the rotational axis. In some instances, the first and the second annular laminations comprise a magnetically permeable material. In certain implementations, the first and the second annular laminations are electrically isolated from each other. The first annular lamination may be a first disjointed annular element defining a first air gap between disjoined segments of the annular element and the second annular lamination may be a second disjointed annular element defining a second air gap between disjoined segments of the second annular element. The first air gap may reside misaligned from the second air gap in the annular lamination stack.

In certain embodiments, the rotor may be coupled to a driven load, the driven load comprising at least one of a flywheel, a generator, or an expander. The rotor may be coupled to a driver, the driver comprising at least one of a motor, an engine, or a turbine.

The magnetic fluxes exert electromagnetic forces on the actuator target. The electronic control package is further configured to energize the control coils around each of the plurality of radial poles with control currents in response to changes of signals from the position sensors so that the rotor is supported by electromagnetic forces without a mechanical contact with the stator.

In certain instances, the stationary radial pole assembly may be composed of magnetically-permeable laminations made of electrical steel stacked together along the body symmetry axis. The isolating interrupts may be introduced in each lamination. In certain instances, circumferential locations of the insolating interrupts may vary from lamination to lamination across the lamination stack.

DETAILED DESCRIPTION

This disclosure relates to generating electromagnetic forces through an electromagnetic actuator and, more particularly, to generating radial and axial electromagnetic forces through a combination radial/axial electromagnetic actuator with an improved axial bandwidth.

Permanent-Magnet-Biased Homopolar Combination Axial/Radial Electromagnetic Actuators offer advantages over arrangements of separate radial and axial actuators including smaller part count, smaller size and weight, and shorter axial length. One of the important applications of such an actuator is in Active Magnetic Bearings (AMBs) providing non-contact support of objects using electromagnetic forces. In particular, when an AMB system is used in rotating machinery, the combination actuator allows achieving better rotordynamic response due to a more compact design than a combination of separate radial and axial actuators. However, the axial channel of a combination actuator may exhibit lower bandwidth characteristics as compared to a dedicated axial actuator. This may complicate the axial control of an AMB system and degrades its performance. In conventional axial electromagnetic actuators, the bandwidth limitation is caused by eddy currents induced in the components of the axial control magnetic circuit, which are made metallic for practical reasons, when an alternating axial control current is applied. These currents result in both amplitude attenuation and a phase lag of the magnetic control flux, which subsequently affect the control force. In addition, in the combination actuator, the bandwidth may be further limited by the currents induced in the stator lamination stack, a part of the radial control magnetic circuit.

Figure 1:
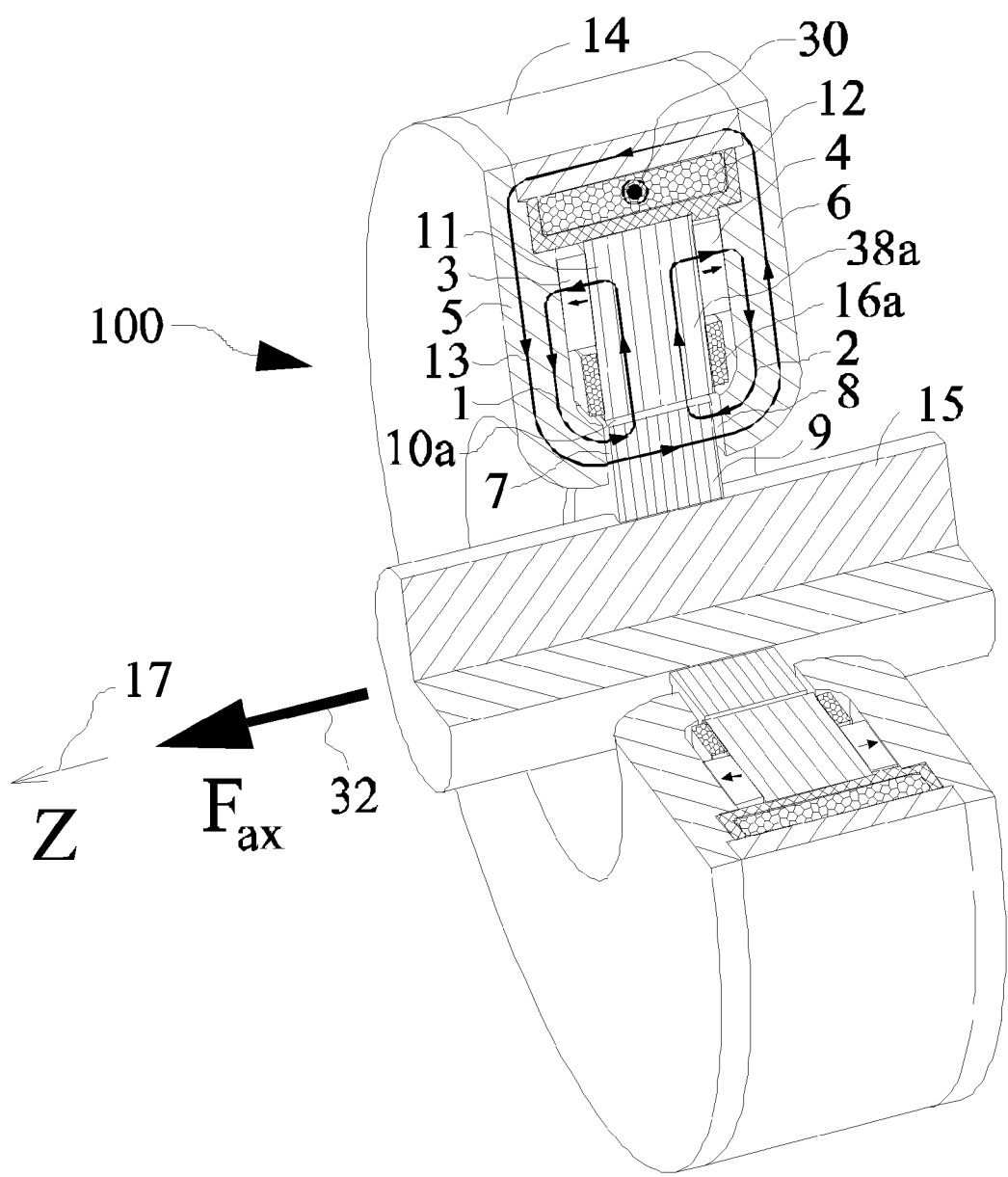
FIG. 1 is a partial cross-sectional schematic of an electromagnetic actuator in accordance with the present disclosure and illustrates generating an axial force.

FIG. 1 is a partial cross-sectional schematic of an electromagnetic actuator 100 in accordance with the present disclosure and illustrates generating an axial force 32. Bias magnetic flux 1, generated by permanent magnet 3, is directed by axial pole 5 to axial gap 7. The bias flux 1 passes through axial gap 7 and enters the actuator target 9. Likewise, magnetic flux 2, generated by permanent magnet 4, is directed by axial pole 6 to axial gap 8. The bias flux 2 passes through axial gap 8 and enters the actuator target 9. Bias fluxes 1 and 2 merge together and exit through the radial gaps 10a through 10d (shown in FIG. 2) into the radial actuator pole assembly 11.

The coil 12 carries axial control current 30 flowing around the actuator axis 40. This current 30 produces magnetic axial control flux 13 which propagates through the axial pole 5, axial gap 7, actuator target 9, axial gap 8, axial pole 6 and axial back-iron 14. The magnitude and direction of the flux 13 can be changed by changing the current 30 in the coil 12. If the axial control flux 13 is zero, the bias flux 1 in the axial gap 7 is equal or near equal to the bias flux 2 in the axial gap 8 and the net axial electromagnetic force acting on the actuator target 9 is zero or near zero. If there is a non-zero axial control flux 13 flowing in the direction shown in FIG. 1, the control flux 13 adds to the bias flux 1 in the axial gap 7, but subtracts from the bias flux 2 in the axial gap 8. Because of the differences in the flux densities on the actuator target sides facing gaps 7 and 8, there will be an axial force $F_{ax}$ 32 directed along the Z-axis 17 towards the axial pole 5 (positive Z-direction). Reversing direction of the current 30 in the control coil 12 reverses the direction of the force $F_{ax}$ 32. Since the actuator target 9 is rigidly mounted on the machine shaft 15, all the forces exerted on it are directly transferred to the shaft 15.

Figure 2:
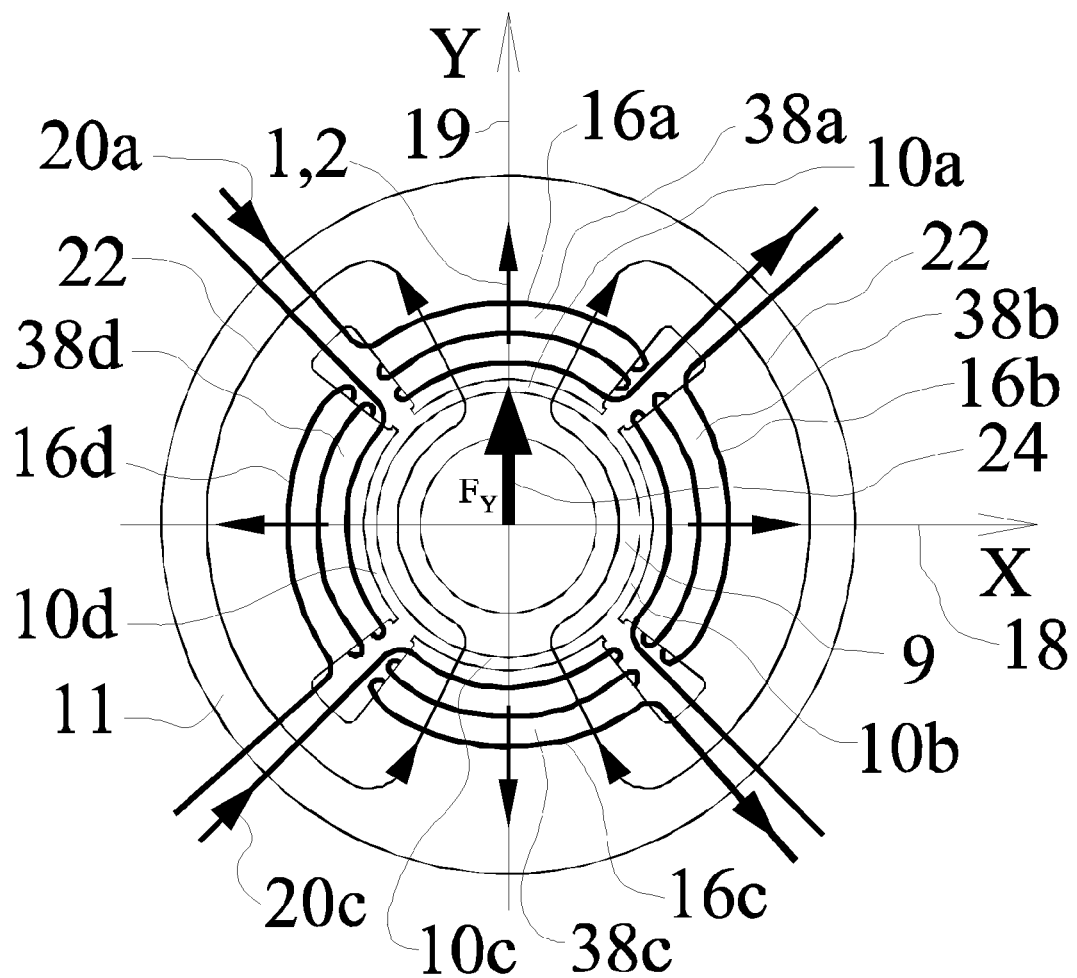
FIG. 2 is a radial sectional schematic of an electromagnetic actuator in accordance with the present disclosure and illustrates generating a radial force.

The magnetic actuator 100 also provides radial forces on the same actuator target 9. The mechanism of the radial force generation is explained in FIG. 2. FIG. 2 is a radial sectional schematic of an electromagnetic actuator in accordance with the present disclosure and illustrates generating a radial force. To produce radial forces in multiple (or all) directions within a radial plane, the radial pole assembly 11 is equipped with at least three radial control poles and control windings around these poles. For example, FIG. 2 shows four radial control windings 16a through 16d located in slots between the poles 38a-38d. The bias fluxes 1 and 2 generated by the magnets 3 and 4 add up in the radial air gaps 10a through 10d and flow radially within the radial poles 38a-38d. When the target 9 is in the central position and there are no currents in windings 16a through 16d, the bias flux density under each pole associated with windings 16a-16d is the same or similar because of the system symmetry. Therefore, the net radial force is zero or close to zero. By energizing the radial control coils 16a-16d, the flux distribution can be altered so that a radial force would develop. For example, FIG. 2 shows coils 16a and 16c being energized with control currents 20a and 20c, respectively. These currents produce radial control flux 22. In the air gap 10a under the pole 38a associated with the control coil 16a control flux 22 adds to the combined bias fluxes 1 and 2, while in the air gap 10c under the pole associated with the control coil 16c it subtracts. Since the flux density will be higher at the top of the target 9 than at the bottom, there will be a radial force $F_Y$ 24 acting on the target, directed along the Y-axis 19 upwards in FIG. 2 (positive Y-direction). Similarly, by energizing windings 16b and 16d a force can be produced in the direction of the X-axis 18.

For practical reasons the radial actuator pole assembly 11 and the actuator target 9 may be assembled of magnetically permeable and electrically conductive laminations (e.g. steel laminations) stacked axially and electrically isolated from each other. The isolation reduces eddy currents in these components induced when the radial control windings 16a-16d are energized with time-varying currents in order to produce time-varying radial forces. An issue with this construction arises when the axial control current 30 changes in time in order to produce a time-varying axial force $F_z$ 32. In this case, the axial control flux 13 may also be varying in time.

Figure 3:
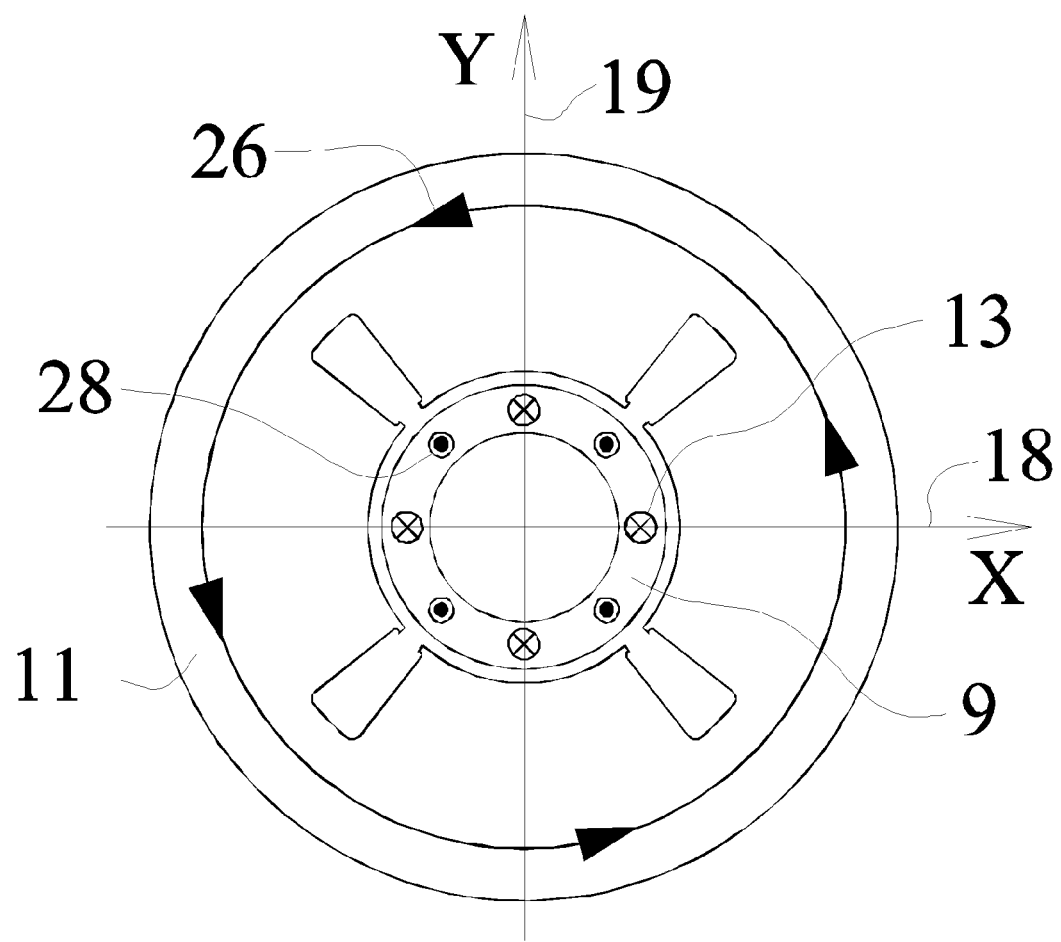
FIG. 3 is an example schematic of a current induced in a radial control pole assembly during production of a time-varying axial control force in accordance with the present disclosure.

According to Faraday's Law, the time varying magnetic flux induces time-varying electromotive forces around the flux. Furthermore, if there is a closed conductive loop surrounding the time-varying magnetic flux, the above electromotive forces will induce electrical currents in that loop. In particular, there will be current 26 induced in the radial actuator pole assembly 11 as shown in FIG. 3. FIG. 3 is an example schematic of a current induced in a radial control pole assembly during production of a time-varying axial control force in accordance with the present disclosure. Having the radial actuator pole assembly 11 composed of electrical steel laminations stacked in the Z direction and electrically isolated from each other cannot prevent current 26 in FIG. 3 from flowing in the lamination plane. Current 26 induces a magnetic flux of its own 28, which becomes superimposed on the original axial control flux 13, affecting the value of the force $F_{ax}$ 32 acting on the actuator target 9. If the axial control current 30 is a harmonic function of time (e.g., a sinusoidal function), then magnetic flux 13, the current 26 and the magnetic flux 28 will also be harmonic functions in the first approximation. If there were no current 26, the control current 30, the magnetic fluxes 13 and the resulting force 32 would be harmonic functions and they would be in phase. Because of the presence of the induced current 26, the superposition of the magnetic fluxes 13 and 28 will be a harmonic function with a smaller amplitude than the original flux 13 and lagging it in time. Consequently, the net axial force 32 exerted on the actuator target 9 will be smaller than it would be without the current 26 and it will be lagging the axial control current 30 in time. This makes producing and controlling the axial force 32 more difficult.

Figure 4:
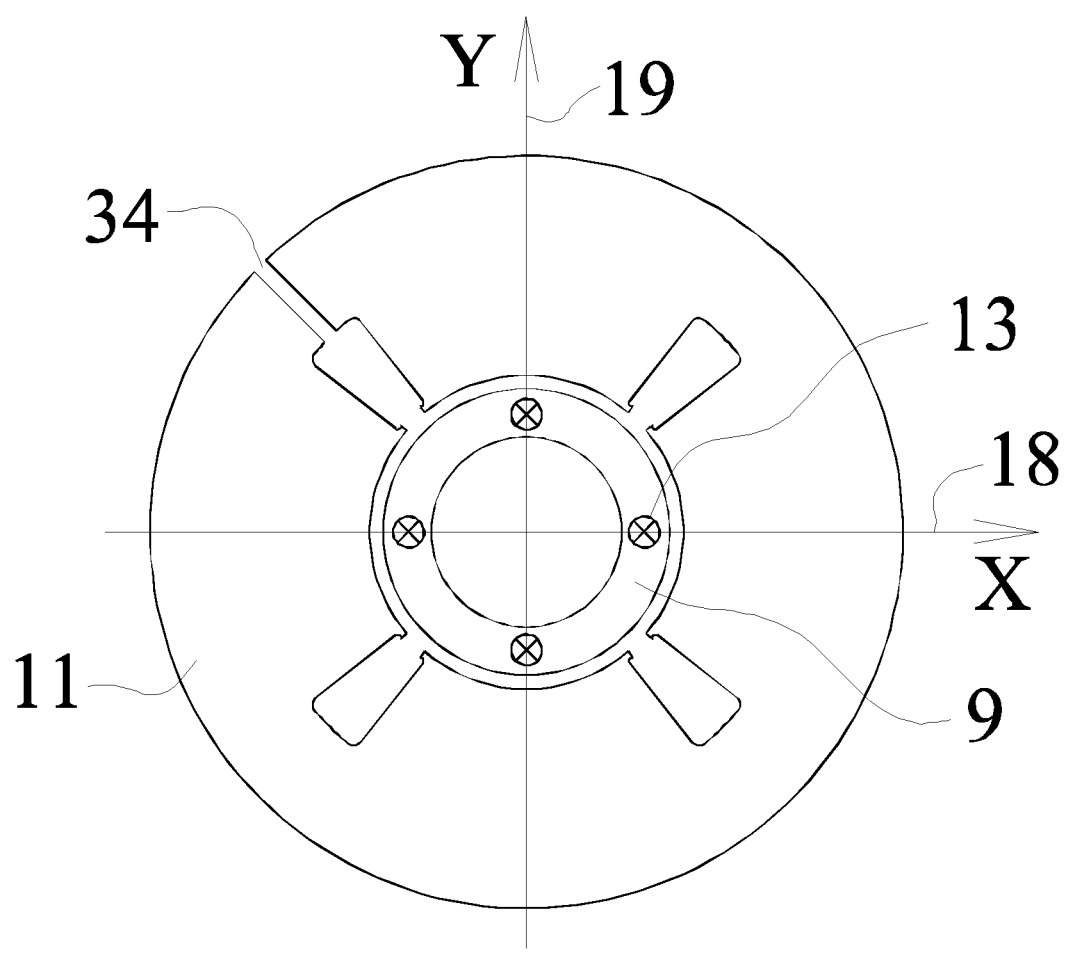
FIG. 4 is a cross-sectional schematic of a radial control pole assembly in accordance with the present disclosure.

FIG. 4 is a cross-sectional schematic of a radial control pole assembly in accordance with the present disclosure. Mitigating current 26 in the radial control pole assembly 11 includes introducing a radial slot 34. In certain implementations, slot 34 can affect magnetic radial control fluxes such as flux 22 in FIG. 2. Moreover, one slot would make magnetic reluctances of the magnetic paths within the radial actuator pole assembly 11 including this slot to be higher than reluctances of the paths bypassing the slot, which would result in different radial force values in different directions even when the control windings 16a-16d are energized with identical currents. Having more than one slot 34, would be difficult without violating the structural integrity of the radial actuator pole assembly 11. Even having a single slot 34 deteriorates the rigidity of the assembly 11.

Figure 5:
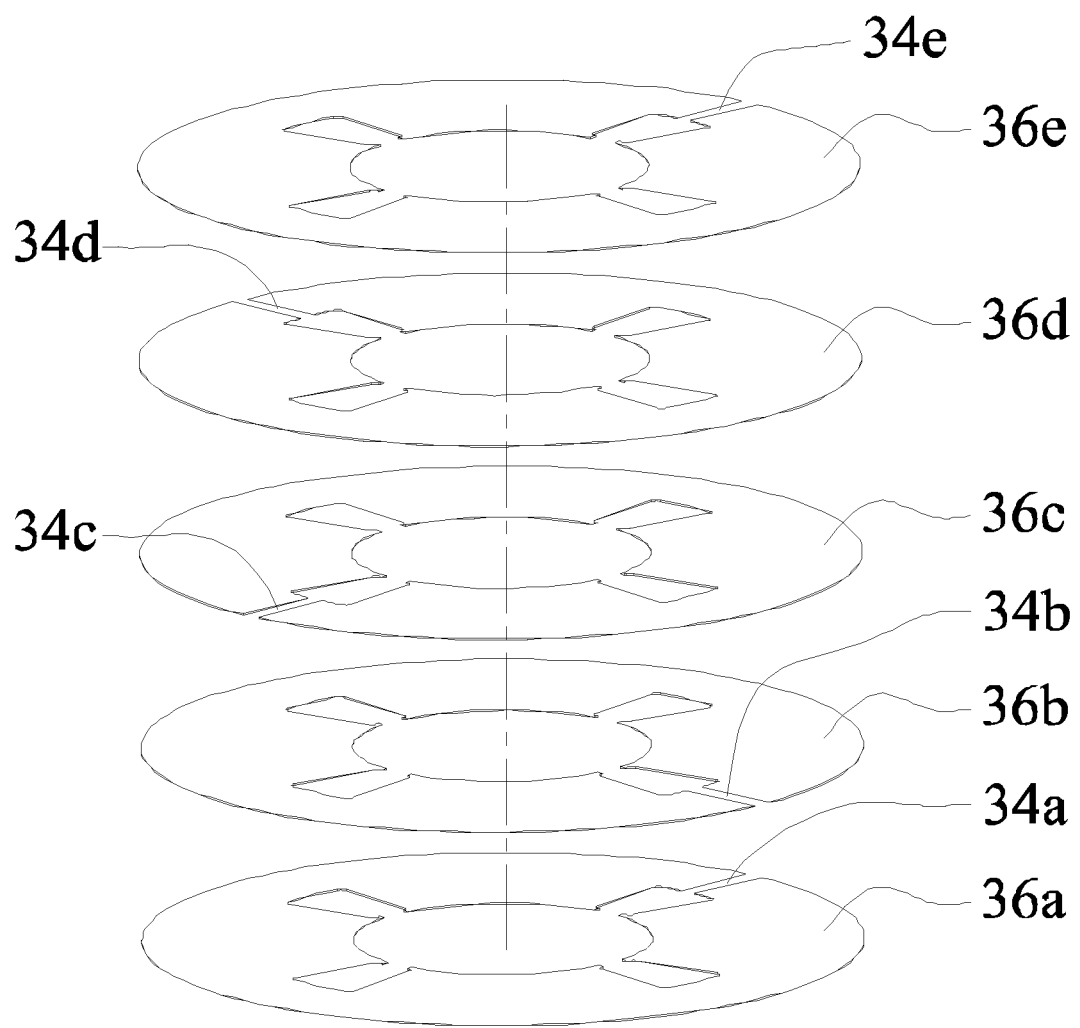
FIG. 5 is a cross-sectional schematic of stacked laminations for radial poles of a magnetic actuator in accordance with the present disclosure.

Reduction of the circular current 26 when the radial actuator pole assembly 11 is composed of individual electrically isolated laminations stacked together in the axial direction may be achieved by introducing a slot in each lamination and rotating them during the stacking so that the slots in any two neighboring laminations do not overlap. This method of preventing a current in the radial control pole assembly is illustrated in FIG. 5. FIG. 5 is a cross-sectional schematic of stacked laminations for radial poles of a magnetic actuator in accordance with the present disclosure. In FIG. 5, each lamination 36a through 36e has a radial slot 35a through 35d, and each subsequent lamination is rotated with respect to the previous lamination by 90 degrees so that the slots in any two neighboring laminations do not overlap. In a general case of an arbitrary number of poles, the rotation angle can be calculated as 360 degrees divided by the number of poles—four in the example shown in FIG. 5. It is also not necessary to rotate the laminations consequently by the same angle—any method of rotation would work as long as slot locations in any two neighboring laminations do not coincide. Furthermore, a variety of shapes and locations of the slots can be utilized as long as they completely interrupt the closed current loop around the lamination axis.

In some aspects, the proposed homopolar combination axial/radial magnetic actuator 100 may be utilized as a part of an Active Magnetic Bearing (AMB) system to support a rotor of a rotational machine without a mechanical contact. The rotational machine can be, for example, an electric pump including an electric motor driving an impeller mounted directly on the motor shaft. The electric motor may have a rotor and a stator. Alternatively, the impeller can be driven by a flow of gas or liquid and spin the rotor attached to it through the shaft. In this case, the motor can be used as a generator. In embodiments, the rotor of the electric machine can be supported without mechanical contact by means of, for example, a combination axial/radial AMB and a radial AMB located on the opposite ends of the rotor. The combination axial/radial AMB utilizes the combination axial/radial electromagnetic actuator per present invention to exert radial and axial forces on an actuator target firmly mounted on the rotor in response to rotor displacements from the desired non-contact position measured with a set of sensors included in the AMB.

Figure 6:
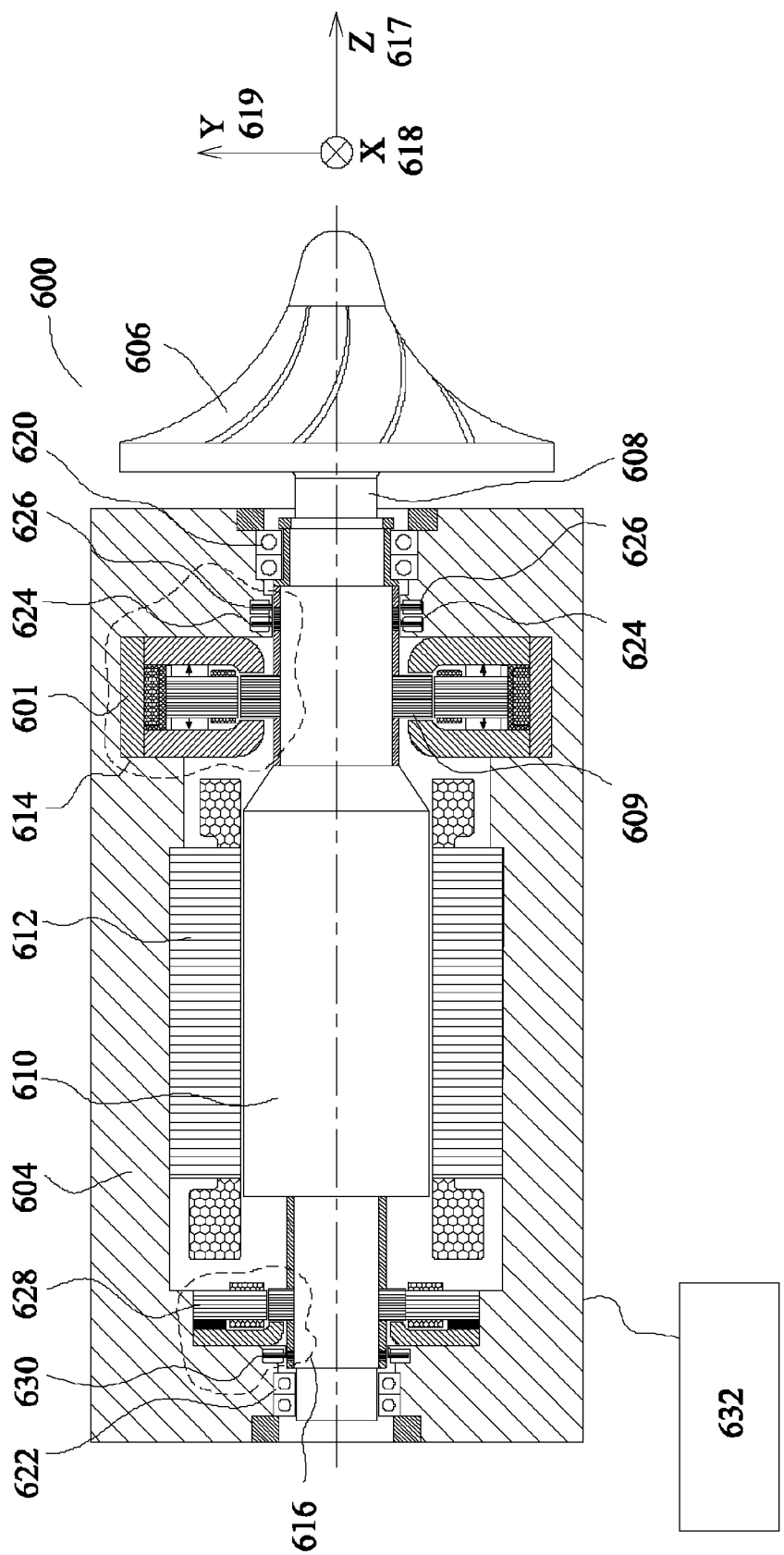
FIG. 6 is a cross-sectional schematic of an example of an AMB system in an electric rotational machine.

FIG. 6 is a cross-sectional schematic of an example of an AMB system in an electric rotational machine 600. The rotational electric machine 600 can be, for example, an electric pump consisting of an electric motor 604 driving an impeller 606 mounted directly on the motor shaft 608. The electric motor 604 shown in FIG. 6 has a rotor 610 and a stator 612. Alternatively the impeller 606 can be driven by a flow of gas or liquid and spin the rotor 610 attached to it through the shaft 608. In this case the motor 604 can be used as a generator which would convert the mechanical energy of the rotor 610 into electricity. In embodiments, the rotor 610 of the electric machine 600 can be supported radially and axially without mechanical contact by means of front and rear radial AMBs 614 and 616. The front AMB 614 provides an axial suspension of the entire rotor 610 and a radial suspension of the front end of the rotor, whereas the rear AMB 616 provides only radial suspension of the rear end of the rotor 610. When the AMBs 614 and 616 are not working, the rotor rests on the mechanical backup bearings 620 and 622. The front backup bearing 620 may provide the axial support of the entire rotor 610 and a radial support of the rotor front end, whereas the rear backup bearing 622 may provide radial support of the rear end of the rotor 610. There are sufficient radial clearances between the inner diameters of the mechanical backup bearings 620, 622 and the outer diameters of the rotor portions interfacing with those bearing to allow the rotor 610 to be positioned radially without touching the backup bearings 620, 622 when the AMBs 614 and 616 are activated. Similarly, there are sufficient axial clearances between the backup bearings 620, 622 and the portions of the rotor 610 interfacing with those bearings to allow the rotor 610 to be positioned axially without touching the backup bearings 620 and 622 when the AMBs 614 and 616 are activated.

The front AMB 614 consists of a combination radial and axial electromagnetic actuator 601 per the concepts described herein, radial position sensors 624, axial position sensor 626 and control electronics 632. The electromagnetic actuator 601 in accordance with the concepts described herein may be capable of exerting radial and axial forces on the actuator target 609 firmly mounted on the rotor 610. The axial force is the force in the direction of Z-axis 617 and the radial forces are forces in the direction of X-axis 618 (directed into the page) and the direction of Y-axis 619. The actuator may have several sets of coils corresponding to each of the axes and the forces may be produced when the corresponding coils are energized with control currents produced by control electronics 632. The position of the front end of the rotor in space is constantly monitored by non-contact position sensors 624 and 626. The non-contact position sensors 624 can monitor radial position of the rotor whereas the position sensor 626 monitors the axial position of the rotor.

Signals from the position sensors 624 and 626 may be input into the control electronics 632, which may generate currents in the control coils of the electromagnetic actuator 601 when it finds that the rotor is deflected from the desired position such that these currents may produce forces pushing the rotor back to the desired position.

In certain instances, smaller axial gain attenuation with frequency and smaller phase difference between the actuator force and the control current in the combination actuator 601 per the concepts described herein compared to conventional designs can result in a larger axial load capacity at any particular frequency and simplify control design.

The rear AMB 616 consists of an electromagnetic actuator 628, radial non-contact position sensors 630, and control electronics 632. It may function similarly to the front AMB 614 except that it might not be configured to control the axial position of the rotor 610 because this function is already performed by the front AMB 614. Correspondingly, the electromagnetic actuator 628 may not be able to produce controllable axial force and there may be no axial position sensor.

A number of embodiments have been described. Nevertheless, it will be understood that various modifications may be made without departing from the concepts described herein. Accordingly, other embodiments are within the scope of the following claims.

What is claimed is:

1. A magnetic bearing electromagnetic actuator comprising:
a body having a rotational axis;
a first pole residing apart from the body, the first pole adjacent a first end facing surface of the body and adapted to communicate magnetic flux across a gap with the first end facing surface of the body;
a second pole residing apart from the body, the second pole adjacent a second end facing surface of the body and adapted to communicate magnetic flux with the second end facing surface of the body, the body, the first pole, and the second pole magnetically coupled and defining an axial magnetic control circuit;
a first annular disjointed lamination concentric with the rotational axis of the body and including a first gap disrupting the continuity of the lamination around the rotational axis,
a second annular disjointed lamination concentric with the rotational axis of the body and including a second gap disrupting the continuity of the lamination around the rotational axis,
wherein the first annular disjointed lamination and the second annular jointed lamination are stacked along the rotational axis of the body and define a plurality of radial poles residing apart from the body, the plurality of radial poles adjacent a lateral facing surface of the body and adapted to communicate magnetic fluxes with the lateral facing surface of the body, the body and the plurality of radial poles defining a plurality of radial magnetic control circuits, the plurality of radial poles adapted to communicate magnetic fluxes with the lateral facing surface of the body and at least one of the first pole or the second pole, and the body, the plurality of radial poles, and at least one of the first pole or the second pole defining a magnetic bias circuit.

2. The magnetic bearing electromagnetic actuator of claim 1 wherein the end facing surface of the body is orthogonal to the rotational axis.

3. The magnetic bearing electromagnetic actuator of claim 1 wherein the body incorporates a magnetically permeable actuator target, the actuator target adapted to communicate a magnetic flux.

4. The magnetic bearing electromagnetic actuator of claim 1, further comprising a magnetic element configured to produce magnetic bias flux in the magnetic bias circuit.

5. The magnetic bearing electromagnetic actuator of claim 1, further comprising an axial coil adapted to produce a magnetic flux in the axial magnetic control circuit and a plurality of radial coils adapted to produce magnetic fluxes in the plurality of radial magnetic control circuits.

6. The magnetic bearing electromagnetic actuator of claim 5 wherein the magnetic flux entering the end facing surface of the body exerts an axial force on the body and the magnetic fluxes entering the lateral surface of the body exert radial forces on the body.

7. The magnetic bearing electromagnetic actuator of claim 6 wherein the axial force is proportional to the magnetic flux in the axial magnetic control circuit and the radial forces are proportional to the magnetic fluxes in the radial magnetic control circuits.

8. The magnetic bearing electromagnetic actuator of claim 1 wherein the first and the second annular laminations comprise a magnetically permeable material.

9. The magnetic bearing electromagnetic actuator of claim 1 wherein the first and the second annular laminations are electrically isolated from each other.

10. The magnetic bearing electromagnetic actuator of claim 1, wherein the first gap comprises a first slot and the second gap comprises a second slot, and wherein the first slot resides misaligned from the second slot in the annular lamination stack.

11. An electric machine system comprising:
a stator;
a rotor having a rotational axis configured to move relative to the stator;
a magnetic bearing electromagnetic actuator subassembly comprising:

a cylindrical actuator target rigidly mounted on the rotor;

a first axial pole residing apart from the actuator target, the first axial pole adjacent a first end facing surface of the actuator target and adapted to communicate magnetic flux across a gap with the first end facing surface of the actuator target;

a second axial pole residing apart from the actuator target, the second axial pole adjacent a second end facing surface of the actuator target and adapted to communicate magnetic flux with the second end facing surface of the actuator target;

an axial back-iron magnetically linking the first axial pole and the second axial pole; the actuator target, the first axial pole, the second axial pole and the axial back-iron are magnetically coupled and defining an axial magnetic control circuit;

an axial control conductive coil adapted to produce a magnetic flux in the axial magnetic control circuit;

a magnetically permeable annular element located concentric to the rotational axis and including a plurality of radial poles and an electrically isolating radial gap interrupting a conductive path around the rotational axis, the magnetically permeable annular element including a plurality of radial poles residing apart from the actuator target, the plurality of radial poles adjacent a lateral facing surface of the actuator target and adapted to communicate magnetic fluxes with the lateral facing surface of the actuator target, the actuator target and the plurality of radial poles defining a plurality of radial magnetic control circuits, the plurality of radial poles adapted to communicate magnetic fluxes with the lateral facing surface of the actuator target and at least one of the first axial pole or the second axial pole, the actuator target, the plurality of radial poles and at least one of the first axial pole or the second axial pole defining a magnetic bias circuit;

radial control conductive coils wound around the radial poles and adapted to produce a magnetic flux in the radial magnetic control circuit;

one or more position sensors configured to sense a position of the actuator target; and at least one control electronics package configured to control the electric currents in the axial control conductive coil and radial control conductive coils.

12. The system of claim 11 wherein the rotor is coupled to a driven load, the driven load comprising at least one of a flywheel, a generator, or an expander.

13. The system of claim 11 wherein the rotor is coupled to a driver, the driver comprising at least one of a motor, an engine, or a turbine.

14. The system of claim 11 wherein the magnetic fluxes exert electromagnetic forces on the actuator target.

15. The system of claim 14 wherein the electronic control package is further configured to energize the control coils around each of the plurality of radial poles with control currents in response to changes of signals from the position sensors so that the rotor is supported by electromagnetic forces without a mechanical contact with the stator.

16. A method for exerting axial and radial forces on a cylindrical body having a symmetry axis, the method comprising:

communicating a first bias magnetic flux through a first axial facing surface of the body;

communicating a second bias magnetic flux through a second axial facing surface of the body;

communicating combined the first and the second bias magnetic fluxes through a lateral surface of the cylindrical body;

communicating an axial control magnetic flux through the first and the second axial facing surfaces of the body;

communicating a radial control magnetic flux diagonally across the body by means of a stationary radial pole assembly located around the body and separated from it; and suppressing electrical currents in the stationary radial pole assembly by introducing isolating interrupts of the conductive paths, the stationary radial pole assembly including disjointed laminations that include an annular disjointed lamination to disrupt the continuity of the conductive paths.

17. The method of claim 16, wherein the disjointed laminations in the stationary radial pole assembly are magnetically-permeable and made of electrical steel stacked together along the body symmetry axis.

18. The method of claim 17 in which the isolating interrupts are introduced in each lamination.

19. The method of claim 18 in which circumferential locations of the insolating interrupts vary from lamination to lamination across the lamination stack.

20. The magnetic bearing electromagnetic actuator of claim 1, wherein the first annular disjointed lamination comprises only one slot to disrupt the continuity of the first annular disjointed lamination.

21. The magnetic bearing electromagnetic actuator of claim 1, wherein the second annular disjointed lamination comprises only one slot to disrupt the continuity of the second annular disjointed lamination.

* * * * *